A. N. QUIDOR.
MERCANTILE RECORDING APPARATUS.
APPLICATION FILED JULY 15, 1909.
980,673.
Patented Jan. 3, 1911.
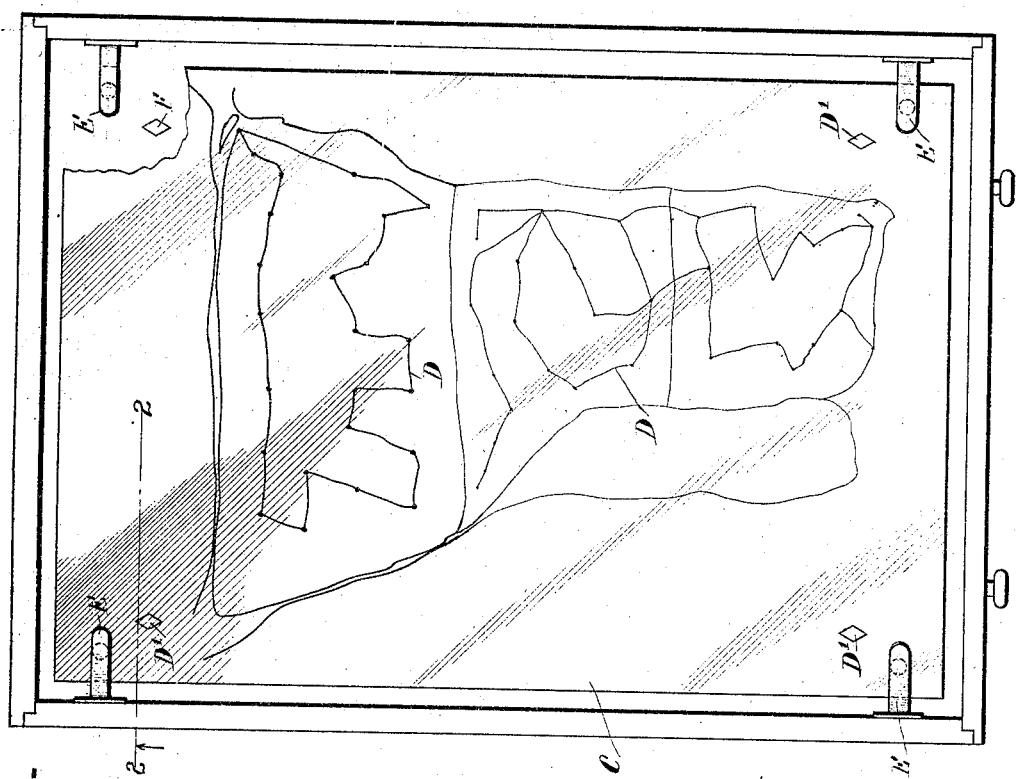
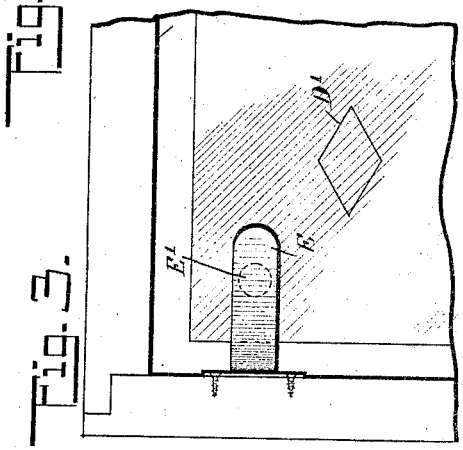
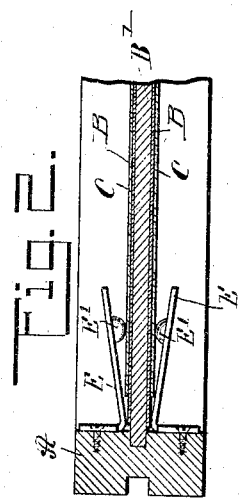
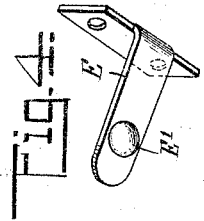
WITNESSES
INVENTOR
Arthur N. Quidor
BY
ATTORNEYS

UNITED STATES PATENT OFFICE.

ARTHUR N. QUIDOR, OF NEW YORK, N. Y.

MERCANTILE RECORDING APPARATUS.

980,673. Specification of Letters Patent. Patented Jan. 3, 1911.

Application filed July 15, 1909. Serial No. 507,692.

*To all whom it may concern:*

Be it known that I, ARTHUR N. QUIDOR, a citizen of the United States, and a resident of the city of New York, borough of Manhattan, in the county and State of New York, have invented a new and Improved Mercantile Recording Apparatus, of which the following is a full, clear, and exact description.

The object of the invention is to provide a new and improved mercantile recording apparatus, more especially designed for use in mercantile houses and arranged for conveniently making and keeping records of the movements of traveling salesmen, or keeping records of any matter involving the use of maps. For the purpose mentioned, use is made of a map contained in a holder, provided with means for removably holding a sheet of tissue paper or tracing paper in position over the map, to allow of tracing a route or the like on the sheet from the map below.

A practical embodiment of the invention is represented in the accompanying drawings forming a part of this specification, in which similar characters of reference indicate corresponding parts in all the views.

Figure 1 is a plan view of the apparatus, part being broken out; Fig. 2 is an enlarged sectional side elevation of the same on the line 2—2 of Fig. 1; Fig. 3 is an enlarged plan view of the same; and Fig. 4 is a perspective view of one of the retaining clips.

In mercantile recording systems as now generally employed for keeping records of the routes of traveling salesmen, use is made of a tape or cord and tacks, of which the tape is stretched over a map to indicate the route and the tacks are used to secure the tape in place, and to locate the cities or other places. By this arrangement no permanent record can be made and the map is unduly mutilated by the use of the tacks. With my invention presently to be described in detail, the cords and tacks are dispensed with and permanent records are made which can be filed away for future reference.

The holder A for a map B preferably in the form of a drawer for use in a cabinet, to permit of storing a large number of maps in a comparatively small space, the map B being printed or pasted on a board or sheet of stiff material fastened in the holder A, approximately midway of the height of the drawer, as plainly indicated in Fig. 2, to permit the use of a map on either face of the stiff material, thus providing two maps for each drawer. Over the face of the map is stretched a sheet C of tissue paper, tracing cloth or any other suitable transparent paper, to permit of tracing routes D, cities and other places onto the said sheet of paper from the map below, as will be readily understood by reference to Fig. 1.

In order to hold the sheet C in position on the face of the map B, use is made of spring clips E secured to the sides of the holder A, and provided on their under sides with retaining members E', of rubber or other flexible material, to hold the sheet C from slipping while in position on the face of the map. The map is further provided with guide marks F, preferably in the form of diamond-shaped figures, located near the corners thereof, and when the sheet C is placed in position on the face of the map then the operator presses the guide marks F on to the sheet C, and traces the said marks on the sheet with a pencil or other marker to form registering marks D', as indicated in the drawings. Now when a record is made and is at some future time to be re-used on the corresponding map, it is only necessary to place the sheet C with the route D thereon back onto the map under the retaining clips E, with the registering marks D' in register with the guide marks F, so that the route D marked on the sheet C directly indicates on the places of the map.

Although I have more particularly shown and described the apparatus for recording the routes of salesmen, it is evident that the same may be used for keeping the records of any matter involving the use of a map. It will also be understood that by the arrangement described, the map is not disfigured or mutilated and hence lasts a long time, and the sheet C having a record thereon can be removed at any time from the map, to be filed away for future use, that is, for re-use on the same or a similar map at a later date.

As before stated the holder is preferably in the form of a drawer, and consists of an open frame, having intermediate its upper and lower faces an annular groove, and a board having its edges received in the groove, a map being placed on both faces of the board. Each of the clips consists of a resilient tongue having a retaining member of flexible material in the form of a boss E' on its one face, and having an angular portion provided with openings, whereby it may be secured to the frame. The indicating or guide marks, are merely diamond shaped figures which are traced on the sheet, so that when the sheet is removed it may be replaced correctly by superposing the diamond shaped indicating marks or guides.

Having thus described my invention, I claim as new and desire to secure by Letters Patent:

1. A device of the class specified, comprising a substantially rectangular open frame, said frame having intermediate its upper and lower faces an interior annular groove, a board having its edges seated in the groove, a map on each face of the board, a sheet of tracing paper on each map, and clips for holding said sheets in place; each of said clips consisting of a resilient tongue having a boss of flexible material for engaging the sheet, and an angular portion secured to the frame, said maps having guide marks at their corners for the purpose specified.

2. A device of the class specified, comprising a substantially rectangular open frame, said frame having intermediate its upper and lower faces an interior annular groove, a board having its edges seated in the groove, a map on each face of the board, a sheet of tracing paper on each map, and clips for holding said sheets in place; said maps having guide marks for the purpose specified.

In testimony whereof I have signed my name to this specification in the presence of two subscribing witnesses.

ARTHUR N. QUIDOR.

Witnesses:
 THEO. G. HOSTER,
 PHILIP D. ROLLHAUS.